US012549356B2

(12) United States Patent
Pitts

(10) Patent No.: US 12,549,356 B2
(45) Date of Patent: Feb. 10, 2026

(54) METHOD OF SEMANTIC TRANSPOSITION OF TEXT INTO AN UNRELATED SEMANTIC DOMAIN FOR SECURE, DENIABLE, STEALTH ENCRYPTION

(71) Applicant: Lauren Pitts, Ottawa (CA)

(72) Inventor: Lauren Pitts, Ottawa (CA)

( * ) Notice: Subject to any disclaimer, the term of this patent is extended or adjusted under 35 U.S.C. 154(b) by 19 days.

(21) Appl. No.: 18/833,707

(22) PCT Filed: Jan. 26, 2023

(86) PCT No.: PCT/CA2023/050105
§ 371 (c)(1),
(2) Date: Jul. 26, 2024

(87) PCT Pub. No.: WO2023/141715
PCT Pub. Date: Aug. 3, 2023

(65) Prior Publication Data
US 2025/0150267 A1    May 8, 2025

Related U.S. Application Data

(60) Provisional application No. 63/304,187, filed on Jan. 28, 2022.

(51) Int. Cl.
*H04L 9/08* (2006.01)

(52) U.S. Cl.
CPC ................... *H04L 9/088* (2013.01)

(58) Field of Classification Search
CPC ....................................... H04L 9/088
See application file for complete search history.

(56) References Cited

U.S. PATENT DOCUMENTS

| 10,608,814 B2 | 3/2020 | Samid | |
|---|---|---|---|
| 2016/0119141 A1* | 4/2016 | Jing | H04L 9/3221 |
| | | | 713/156 |
| 2020/0287705 A1* | 9/2020 | Samid | H04L 9/3231 |

FOREIGN PATENT DOCUMENTS

| WO | WO-9406086 A1 * | 3/1994 | G06F 40/268 |

OTHER PUBLICATIONS

International Search Report and Written Opinion for PCT/CA2023/050105 (May 3, 2023).

(Continued)

*Primary Examiner* — Hee K Song
(74) *Attorney, Agent, or Firm* — Merchant & Gould P.C.

(57) ABSTRACT

A method for linguistically encrypting a plaintext, comprising mapping the plaintext to a semantics and language model, thereby forming a semantically mapped plaintext; deriving a topology of the semantically mapped plaintext; and either conserving the topology during the semantic transposition, or performing a reversible transformation on the topology which is expected to be eventually reversed during decryption. Using an encryption key for linguistic encryption, a semantic transposition is applied onto the semantically mapped plaintext to produce a ciphertext which is a human-readable text in a semantic domain distinct from the plaintext. Conversely, the method can be used for decryption of the ciphertext into the plaintext using a decryption key. A zero-knowledge-proof can be used by sending a query in the semantic domain of the ciphertext, and a reply to the combined query and ciphertext can be generated using the semantic transposition engine (STE) by both parties for sharing and comparison.

18 Claims, 6 Drawing Sheets

(56) References Cited

OTHER PUBLICATIONS

Communication Theory of Secrecy Systems, C.E. Shannon, Bell System Technical Journal, 60 pgs.

* cited by examiner

METHOD OF SEMANTIC TRANSPOSITION OF TEXT INTO AN UNRELATED SEMANTIC DOMAIN FOR SECURE, DENIABLE, STEALTH ENCRYPTION

This application is a National Stage Application of PCT/CA2023/050105, filed Jan. 26, 2023, which claims benefit of U.S. Provisional Patent Application No. 63/304,187, filed Jan. 28, 2022, which applications are incorporated herein by reference. To the extent appropriate, a claim of priority is made to each of the above-disclosed applications.

FIELD OF THE INVENTION

The subject matter disclosed generally relates to cryptography. More specifically, it relates to the encryption and decryption of textual data.

BACKGROUND

Referring to FIG. 1 (prior art), modern codes and ciphers overwhelmingly adhere to a single, dominant, cryptographic security paradigm, where meaningful messages (e.g., meaningful plaintext messages) are mathematically transformed, using hard-math mathematical encryption, into an output which is designed to be something else, and which presents itself as nonsense (ciphertext) for the human observer. This can be done for distribution or storage of these meaningful messages, to keep the original plaintext away from a potential adversary. Then, authorized recipients in possession of an appropriate key reverse the math to perform the mathematical decryption and recover the original meaning (such as the original meaningful plaintext messages).

This "nonsense" output most often presents as a seemingly random string of alphanumeric characters, but will be described here simply as "nonsense" or "gibberish" in order to more fully capture the broader range of modern ciphertext possibilities. Such output might not even be text, strictly speaking: for example, a string of dots placed strategically, but with apparent randomness in relation to each other, or even a string of sounds, apparently random in their sequence, might constitute nonsense cipher output.

Communication via reversible mathematically-generated nonsense, in all its forms, has four significant weaknesses:

Weakness 1. Reliance on Maths & the Quantum Threat: The role of mathematics within the dominant cryptography paradigm renders it increasingly insecure. Security would be greatly enhanced if the operations of encryption-decryption themselves were secret, unknown to adversaries, but mathematical functions are universally known and a priori accessible. This weakness is compounded in a world where adversaries 'mathematical powers are rapidly expanding, as with the impending rise of quantum computing and A.I. cryptanalysis. Modern encryption depends upon "hard maths": primarily, one-way "trapdoor functions" (for example, Diffie-Hellman or RSA) or pseudo-randomization (e.g., block-ciphers), by which the move from plaintext to cypher text is mathematically easy but the move back, from ciphertext to original plaintext, is so computationally demanding as to be intractable unless one has at least part of the originating math, a key, or key stream initialization vector, in hand. But, what is hard now may be easy a few months or years from now as quantum computing and A.I. techniques evolve, so any information currently secured by the encryption of hard maths may be vulnerable to unauthorized access in the very near future.

Weakness 2. Cryptanalytic Targeting & Fingerprinting: Storing and transmitting a document or a communication which comprises plain "nonsense" instead of meaningful contents may look suspicious and draws attention, identifying for adversaries precisely those documents to which they do not (as yet) have access to the contents. Also, nonsense implicitly suggests that some effort has been made to protect secrets, likely contained therein. The nonsense quality of modern ciphertexts thereby aids cryptanalysts by identifying them as proper targets. Moreover, most encryption systems within the dominant paradigm leave their individual "fingerprint" (given sufficient sample size), identifying for attackers which methods and systems are more likely to be relevant. Thus, even though the ciphertext content presents as nonsense, it narrows the problem space for attackers, who can then focus on applying just those techniques most likely to succeed.

Weakness 3. Cryptanalytic Success Marker: The fact that successful decryption solutions transform nonsense into meaningfulness gives adversaries instant feedback, a clear indicator of success or failure for each round of cryptanalytic attack: if an attempt at decryption outputs gibberish, move on to next round of attack; if output looks meaningful, halt (the balance of probabilities being that any solution generating meaningful output is the correct one). Attackers generally know, immediately and unambiguously in the case of larger messages, that they have the original message in hand simply in virtue of the natural-language quality of a given decryption attempt's output. In this way, the clear transition from encrypted nonsense to decrypted meaningfulness is essential to modern cryptanalytic and brute force methods of attack.

Weakness 4. Self-Authentication & Damage from Disclosure: The power of cryptanalytic attack is in part the damage that may be done through unauthorized disclosure of encrypted information. The extent of such damage to individuals and institutions largely depends upon the credibility of the information disclosed. Nonsense-based encryption carries within it the mechanism for self-authentication, and therefore maximizes the potential harm of unauthorized disclosure. How this works: coherent, meaningful, decryption solutions typically authenticate themselves in virtue of the fact that mathematical operations so rarely produce complex meaning from nonsense by chance alone. For information of substantial length, therefore, any meaningful decryption solution (particularly one embodying context-relevant subject matter), can, with very few exceptions, safely be assumed to be the correct solution. This mathematical assurance eliminates all reasonable epistemic uncertainty, thereby precluding plausible deniability for messages so obtained and ensuring the public credibility of compromising revelations disclosed therein.

Collectively these four weaknesses, alongside rapidly improving cryptanalytic technologies (quantum computing and A.I. cryptanalysis tools), make it extremely likely that cryptanalytic targeting, attack, access, and disclosure of sensitive information currently secured via dominant-paradigm encryption will increase in frequency, success, and impact.

On another note, there is U.S. Pat. No. 10,608,814 (Gideon Samid) directed to "Transposition equivocation cryptography". aims at outputting a small number of "decoys" (inauthentic alternatives to the correct plaintext solution, for each ciphertext). This is intended to sustain "equivocation" by making the space of potential solutions greater than 1, but that method from the prior art does so by simply adding in a few common words or phrases, without regard for the actual content of the original plaintext—for example, "no, false, untrue, never, no-way, it-is, it-is-not, as-if, would-appear, a wild thought, not to be accused of seemingly, unlikely". U.S. Pat. No. 10,608,814 does not address many of the weaknesses above in a practicable or secure manner, as will be apparent in the disclosure further below.

SUMMARY

According to an aspect of the disclosure, there is provided a method for linguistically encrypting a plaintext, comprising:
- mapping the plaintext to a semantics and language model, thereby forming a semantically mapped plaintext; and
- using an encryption key for linguistic encryption, applying a semantic transposition onto the semantically mapped plaintext to produce a ciphertext which is a human-readable text in a semantic domain distinct from the plaintext.

According to an embodiment, there is further a step of, upon forming a semantically mapped plaintext, deriving a topology of the semantically mapped plaintext.

According to an embodiment, the step of deriving the topology comprises generating a machine representation using a semantic nature of terms in the semantically mapped plaintext, a direction and probability relationships connecting the terms in said direction.

According to an embodiment, there is further a step of conserving said topology during the step of applying the semantic transposition onto the semantically mapped plaintext.

According to an embodiment, conserving the topology comprises preserving relationships as computable values to ensure that encryption performed by applying the semantic transposition can undergo, symmetrically, a decryption by applying another semantic transposition.

According to an embodiment, there is further a step of transforming the topology by any one of: shifting, morphing, stretching, and compressing the topology during the step of applying the semantic transposition onto the semantically mapped plaintext, according to computable rules to be applied on the topology and which are dictated by the encryption key.

According to an embodiment, transforming the topology is performed according to computable rules to be applied on the topology which are dictated by the encryption key in combination with features of the plaintext.

According to an embodiment, the step of applying the semantic transposition onto the semantically mapped plaintext using the encryption key is constraining by providing an information channel profile and limiting to the semantic transposition to transpose in a semantic domain which is consistent with the information channel profile.

According to an embodiment, the step of mapping the plaintext comprises mapping interrelations between words of the plaintext in terms of: relationships across a semantics layer of the semantics and language model, or associated probability distributions internal to the semantics and language model; wherein the step of applying the semantic transposition is performed by taking into account said interrelations.

According to another aspect of the disclosure, there is provided a method for linguistically decrypting a ciphertext which is a human-readable text, comprising:
- mapping the ciphertext to a semantics and language model, thereby forming a semantically mapped ciphertext; and
- using a decryption key for linguistic decryption, applying a semantic transposition onto the semantically mapped ciphertext to produce a plaintext which is human-readable and which is in a semantic domain distinct from the ciphertext.

According to an embodiment, there is further a step of, upon forming a semantically mapped ciphertext, deriving a topology of the semantically mapped ciphertext.

According to an embodiment, the step of deriving the topology comprises generating a machine representation using a semantic nature of terms in the semantically mapped ciphertext, a direction and probability relationships connecting the terms in said direction.

According to an embodiment, there is further a step of conserving said topology during the step of applying the semantic transposition onto the semantically mapped ciphertext.

According to an embodiment, there is further a step of transforming the topology by any one of: shifting, morphing, stretching, and compressing the topology during the step of applying the semantic transposition onto the semantically mapped ciphertext, according to computable rules to be applied on the topology and which are dictated by the decryption key.

According to an embodiment, transforming the topology is performed according to computable rules to be applied on the topology which are dictated by the decryption key in combination with features of the ciphertext.

According to an embodiment, the step of mapping the ciphertext comprises mapping words or phrases to the semantics and language model to give a computable value to the words or phrases.

According to an embodiment, the step of mapping the ciphertext comprises mapping interrelations between words of the ciphertext in terms of: relationships across a semantics layer of the semantics and language model, or associated probability distributions internal to the semantics and language model; wherein the step of applying the semantic transposition is performed by taking into account said interrelations.

According to another aspect of the disclosure, there is provided a zero-knowledge-proof method for user authentication and verifying message integrity, comprising the steps of:
- by a first user, sending a ciphertext via a communication channel to a second user, the ciphertext being a human-readable text produced by a semantic transposition engine performing semantic transposition of a semantically mapped plaintext into a semantic domain distinct from the plaintext;
- receiving from the second user a query in relation to the content of the ciphertext, the query being within the semantic domain of the ciphertext, and treating the ciphertext content as factual;
- generating a reply for the query by using the semantic transposition engine and an assigned key, but without performing the semantic transposition, instead remaining within the semantic domain of the ciphertext; said reply being expected to be also reproduced by the second user; and
- sending the reply for the query to the second user for comparison, for user authentication and verifying message integrity.

According to an embodiment, the query is sent through the communication channel.

According to an embodiment, the query is a request for information, clarification, details, or confirmation of contents in the ciphertext.

According to an embodiment, for each sending of the ciphertext, there is a further step of repeating the steps of receiving from the second user the query, generating the reply and sending the reply for comparison this process in both directions, so that each sending of the ciphertext comprises mutual user authentication and verification of message integrity.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
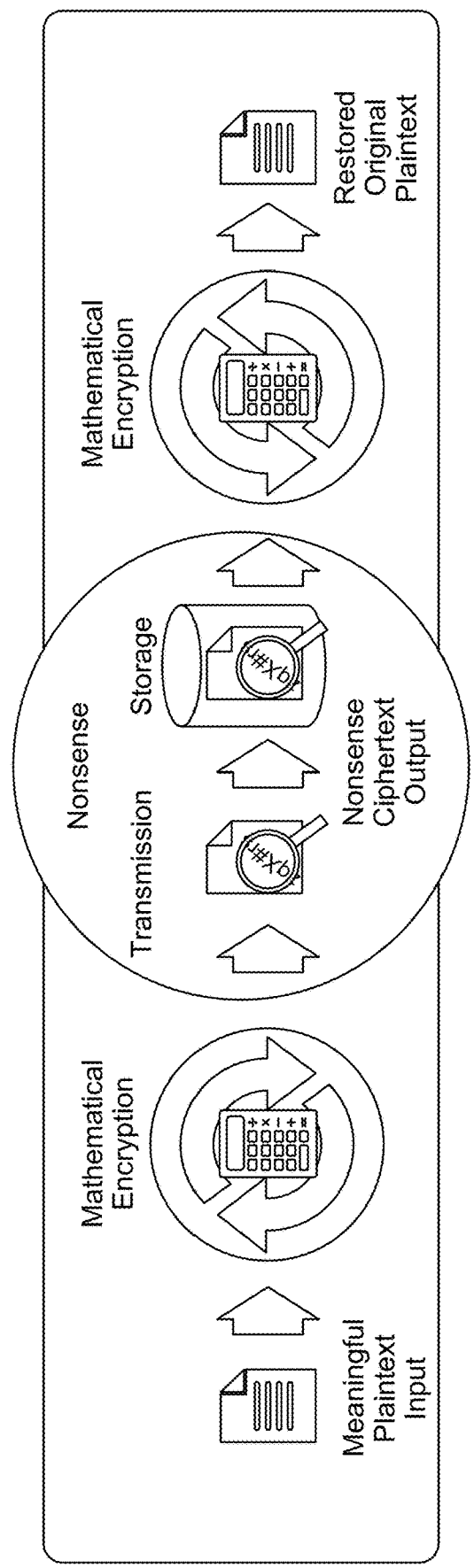
FIG. 1 is a schematic diagram illustrating a method for mathematically encrypting a plaintext into a manifestly meaningless, and therefore manifestly encrypted ciphertext, and then mathematically decrypting the ciphertext into the original message, according to the prior art.

The invention described herein, Semantic Transposition Encryption (STE), achieves cryptanalytically-unbreakable information theoretic security, utilizing a semantics-and-language based transformation of plaintext into cipher in place of traditional mathematical transformations, while outputting coherent, readable, natural language ciphertext on subject matter unrelated to that of the original plaintext.

In particular, there is described in greater detail below a method for linguistically encrypting a plaintext, comprising mapping a plaintext to a semantics-and-language model, thereby forming a semantically mapped plaintext; using an appropriate key for linguistic encryption, applying a semantic transposition onto the semantically mapped plaintext to produce a ciphertext which is a human-readable text in semantic domain distinct from the plaintext. Conversely, and symmetrically, there is described in greater detail below a method for linguistically decrypting a ciphertext, comprising: mapping a ciphertext to a semantics and language model, thereby forming a semantically mapped ciphertext; and, using an appropriate decryption key, applying a semantic transposition onto the semantically mapped ciphertext to generate a plaintext which depends on the decryption key. The method may further involve the derivation of a topology of the plaintext (or ciphertext during decryption) and conservation of said topology during the step of applying the semantic transposition onto the semantically mapped plaintext (or ciphertext). Optionally, applying the semantic transposition onto the semantically mapped plaintext using the encryption key can be constrained by providing an information channel profile and limiting to the semantic transposition to transpose in a semantic domain which is consistent with the information channel profile.

Now back to the weaknesses identified above, and in relation to current industry trends, current efforts made in the industry nowadays to address and ameliorate these growing threats focus primarily on weakness #1 above, specifically, by making the "hard math" behind the encryption harder to crack. Based on predictions regarding the likely strengths and operational limits of future quantum computing platforms, designers are leveraging mathematical operations, and larger numbers, to generate operations that may remain asymmetrically hard in the new context. Unfortunately, we are not yet in a position to know what will be the limits of quantum hardware or software in decades to come, so many if not all of these "post quantum" encryption methods will likely be entirely ineffectual.

Quantum computing is today where classical computing was in, perhaps, the 1950s—a handful of companies developing their first machines, and trying to get basic computations reliably performed, while the new field of quantum-programming finds its legs. What will quantum-software look like in 25 years? How many qubits will commonly be available for computation? All we can be sure of is that progress in quantum is accelerating, rapidly, and what look like hard limits now may be minor obstacles in five or ten years. And this says nothing of the coming improvements in A.I. driven cryptanalysis. The dominant paradigm's cryptographic reliance on known mathematical operations provides ample basis for A.I. to learn from current encryption tools lessons that will likely remain relevant against the next, quantum-prepared, generation. But what of information stolen in the meanwhile: for example, diplomatic cables, national defence protocols, or corporate trade secrets? Stolen encrypted documents like these are time bombs, awaiting a new trick or breakthrough on the quantum or A.I. side. And when it arrives, in spite of best efforts at trapdoor-based "post quantum" encryption, such documents already intercepted may be laid bare for the world to see.

Weakness #2, "Cryptanalytic Targeting & Fingerprinting," may be addressed, and overcome to some degree, through the addition of steganographic camouflage. Steganography is the practice of concealing a message within another message: e.g., a text file, image, or video is concealed within another text file, image, or video. In this way, mundane documents provide cover so that secrets passed within, either encrypted or unencrypted, do not draw attention to themselves. However, this "cover" comes at a significant cost to efficiency: for the technique to be effective, the cover information must be far larger than the hidden message, meaning that a small fraction of what is stored or transmitted can be useful information. Moreover, once identified, ciphertexts contained therein suffer all the same vulnerabilities. Steganography may distract attackers, at great informational cost, but once the hidden content is revealed, steganographic cover does nothing to address the other three weaknesses.

Weaknesses #3-4 are largely overlooked by those currently working to improve encryption, as they are considered unavoidable due to the necessary reliance on nonsense ciphertext output.

What then is needed? So long as encryption is dependent on universally accessible mathematical operations, and computational complexity, there will always be an arms race against evolving cryptanalytic computational power. That is to say, the security threat inherent in weakness #1 will remain so long as encryption is secured by asymmetrically hard math.

As for weaknesses #2-4, these ultimately derive from the fact that ciphertexts produced by the dominant paradigm take the form of gibberish, or nonsense, particularly as that nonsense so simply and clearly contrasts with the meaningfulness of its correct decryption solution.

Therefore, to overcome these 4 weaknesses, what is needed is a highly secure system and method of encryption that does not produce ciphertexts in the form of nonsense, and that does not depend for its security on computational complexity. The challenge for any preferable alternative is thus to determine what should replace nonsense in ciphertexts, and what, if not mathematical complexity, should security be based on.

Any encryption system that does not produce nonsense must, by definition, produce something meaningful. It would be most natural then, and quite advantageous, for it to produce meaningful, readable, texts that closely resemble unencrypted natural language documents. But importantly, to be useful as a replacement for modern encryption, it must not do so by steganographic means; that is to say, it must not rely on information-inflating camouflage, but instead be able to generate meaningful output that matches input (roughly) in length and complexity, without giving away the original meaning of the plaintext.

As for security, there is an alternative to be found in the tradition of Claude Shannon's "information theoretic security." It offers a principled basis for unbreakable encryption security that does not depend on mathematical complexity or trapdoor asymmetries. Instead, security is achieved by limiting new information latent in ciphertexts so that an adversary cannot possibly glean enough from them to break the cipher. Information theoretically secure systems are cryptanalytically unbreakable even for an ideal adversary with unlimited computational power and unlimited time (making developments in quantum computing and A.I. cryptanalysis irrelevant).

This tradition has been explicitly associated with the generation of random strings—its prototypical use being to output ciphertexts of pure nonsense—on the assumption that anything other than nonsense will give cryptanalysts evidence to narrow the space of possible solutions. On this assumption, the more information that is included in ciphertext (e.g., as its length increases), the more cryptanalytic evidence is availed to attackers. Thus, the exemplar for information theoretic security has always been nonsense ciphertext. It is true that for Shannon's conception of "perfect secrecy," purely random keys of a length equal or greater to the combined total of all messages sent are in fact required, and do generate pure nonsense. But unbreakable information theoretic security does not require "perfect secrecy"; Shannon's 1946 work identifies an alternative, "ideal security", where "it is possible to construct secrecy systems with a finite key for certain 'languages' in which the equivocation does not approach zero as N→∞ [where N=message length]. In this case, no matter how much material is intercepted, the enemy still does not obtain a unique solution to the cipher but is left with many alternatives, all of reasonable probability. Such systems we call ideal systems."—C. E. SHANNON, Communication Theory of Secrecy Systems 1 Material first appearing in a confidential report "A Mathematical Theory of Cryptography" dated Sep. 1, 1946, declassified in 1949.

We can achieve unbreakable information theoretic security while divulging new information with each bit of ciphertext, so long as it is not the cumulative sort of information that would, in its aggregation, significantly reduce 'equivocation', i.e., substantially eliminate competing potential decryption solutions. Preserving overall cryptanalytic uncertainty, two basic sorts of ciphertext information have inherent potential:

A. Information that conforms to pre-existing cryptanalytic biases: that is, the a posteriori reaffirmation of a priori probabilities. Cryptanalysts hereby receive information redundant to that which they already possess.

B. Misinformation: information that alters the cryptanalytic probability space without significantly decreasing overall uncertainty, and without systematically biasing probabilities in favour of correct solutions.

Properly employed, both sorts of information might bring value to ciphertext output without significantly compromising encryption security. Most importantly, because ciphertext no longer needs identify itself as obvious, random, gibberish, it may instead embody the qualities of expected communications, opening up the potential for both stealth and total-deniability.

So, it is in fact possible, practicable, and useful for an encryption system to achieve a substantial form of information theoretic security ("ideal security") while nonetheless outputting meaningful, readable, natural language ciphertext. Any system embodying these requirements would be a significant improvement over the dominant cryptography paradigm in that it may eliminate all four of the earlier-described weaknesses.

The present invention relates generally to data security, and particularly to a system and method for encrypting, decrypting, and authenticating information to secure it against unauthorized access and disclosure. Specifically, the invention relates to a system and method of secure encryption that outputs readable natural-language ciphertext of size and complexity equal to the originating plaintext (on average), but on subject matter entirely removed from that input.

The system and method embody and define a fundamentally new paradigm for encryption: the meaning of plaintext being systematically transposed to an entirely distinct semantic domain, while retaining readability, thereby offering users (information-theoretic) security along with the inherent advantages of stealth and deniability.

This new encryption paradigm, defined and embodied by the invention, may be extended to apply to non-linguistic information, such as statistical data or graphs, in which case the ciphertext output will likewise appear meaningful and natural relative to the norms and expectations typically associated with unencrypted information of those forms.

In doing so, it introduces, embodies, and defines a fundamentally new cryptography paradigm, one not inherently subject to any of the dominant paradigm's four weaknesses (described above).

Figure 2:
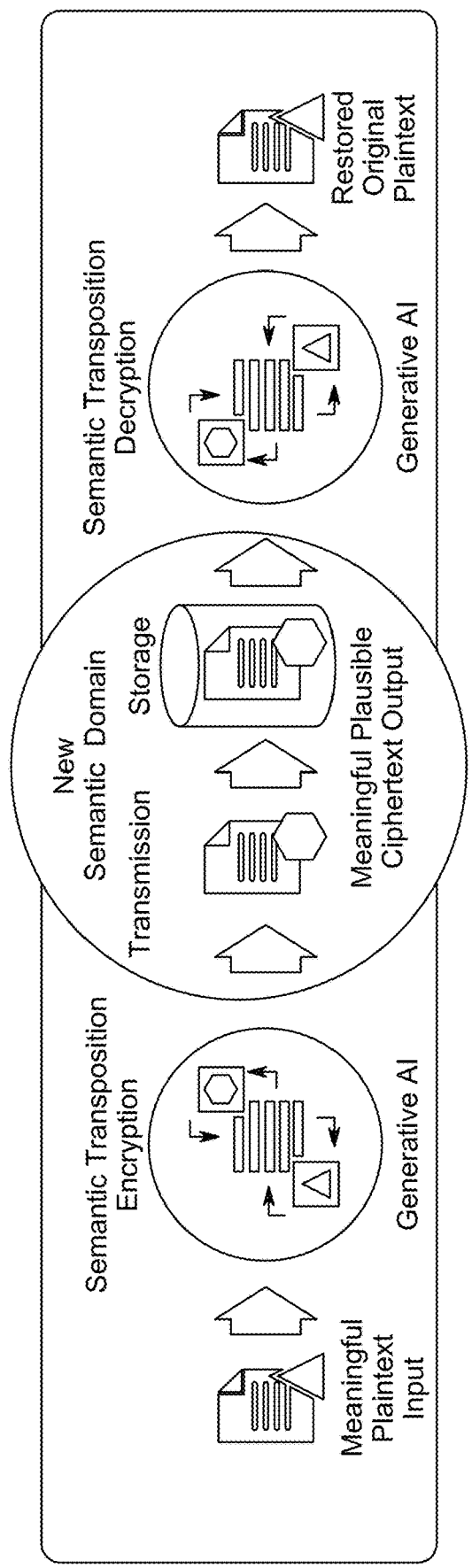
FIG. 2 is a schematic diagram illustrating a method for communicating by linguistically encrypting a plaintext into a ciphertext which appears to be a normal plaintext, but transposed into another semantic domain (semantic transposition encryption), and then linguistically decrypting the ciphertext into the original message, according to an embodiment of the invention.

This is generally shown in FIG. 2, which is a schematic diagram illustrating a method for communicating by linguistically encrypting a plaintext into a ciphertext which appears to be a normal plaintext, but transposed into another semantic domain (semantic transposition encryption), and then linguistically decrypting the ciphertext into the original message, according to an embodiment of the invention.

Before describing the method in greater detail, there is now defined a proper terminology for the method steps further described herein below. For the purposes of the present description, terms traditionally used in relation to cryptography will retain their traditional meanings, unless otherwise indicated here. Novel terminology appearing in descriptions of the invention will also be introduced here.

Plaintext: In keeping with tradition, messages as yet unencrypted are referred to as 'plaintext'.

Semantics-&-Language Model: This refers to a novel hybrid model formed from what would more commonly be realized as two distinct types of models:

First, there are semantic models of the ontological and conceptual sort, typically expressed using RDF (Resource Description Framework) or OWL (Web Ontology Language), which may be extended to include individual entities and events (thereby qualifying as "knowledge graphs").

Second, there are language models, which compute probability distributions for each word in a vocabulary, relative to a given string of words, or at least predict those distributions as a function of non-linear weights across a network (e.g., a recurrent neural network or transformer network). That is, for any given sequence of specific words, language models will predict the likelihood that any given word in that vocabulary will be next. This is the technology behind many auto-fill or word-suggestion features in texting applications. It can also be used to fill out more than a single next word; it may project whole sentences, paragraphs, or even generate entire texts based on some initial prompt. When used in this way, it is sometimes referred to as 'AI text generation'. OpenAI's GPT-3 is an example of such a model, typically employed in extending small human-authored text-prompts with AI generated content.

Text-Topology. A structural model of a given text's internal 'meaning' relationships: these include, but are not limited to semantic or conceptual, logical, explanatory, ontological and/or knowledge-graph relations. There is no equivalent in traditional cryptography. During the encryption phase of STE, text topologies are derived from plaintext in relation to a semantics-and-language model, while during the decryption phase they are derived from ciphertext and its relations to that model.

Information Channel Profile: "Information channel" here refers to a conduit for communicating or for storing particular types of information. Examples of information channels might include a specific social network (for example and without limitation, Twitter™), a corporation's email exchange linking its regional offices, or a cloud repository of user's journal entries. Even the World Wide Web, taken as a whole, could constitute a single information channel if one were looking for a large corpus to profile. Each of these example information channels can be sampled and indexed to create a profile of the information passing through, or into, that channel. Such a profile might describe the occurrence and distribution of vocabulary, format, linked or connected content, use of imagery or graphs, etc. On this basis, a profile may be used to define what normal or expected information looks like within that channel.

Key. In relation to the embodiments described in the present disclosure, "key" is used in a manner roughly in keeping with cryptographic tradition. Keys here (in a preferred embodiment) may, in relation to the plaintext's content, operate to pick out those data-mapping relationships that assign distances and directions to a topology's semantic transposition. These, unlike the long key-streams traditionally associated with information theoretic encryption (e.g., the "One Time Pad"), may be short, even memorizable, secrets and may also function like passwords to 'unlock' communications within the system. Most often a shared-key implementation will be presumed here, but without regard for issues of key-distribution or key-management, as those issues may be resolved through a variety of well-understood solutions. In other words, it is outside the scope of the present disclosure to discuss new key-distribution or key-management as those already known in the art may well be used in combination with the method according to the embodiments described in the present disclosure for the purpose of distributing or managing the encryption key or decryption key to be used in the method.

ST-Algorithm: The 'engine' of STE ("Semantic Transposition Encryption"), a preferred embodiment would be implemented as a program stored on a computer memory and executed by a computer processor, on a local computer or a remote server, guiding the STE processes both during encryption and decryption. Its application in relation to the semantics-and-language model would qualify today as a form of linguistic artificial intelligence (AI), emulating the distinctive characteristics of individual acts of human authorship in entirely new domains.

ST-Settings: In some embodiments, the ST-Algorithm's functions would vary for each installation, or user-group, in relation to a series of user-configured settings. These would be analogous to the plugboard and rotor settings of the 1940s German Enigma machine. Their role is primarily to easily render each installation, or user-group implementation, bespoke and therefore distinct in its output, even in cases where a semantics-and-language model instance may be shared.

Ciphertext: Following cryptographic tradition, the final encrypted output is called a 'ciphertext'. However, given the stealth nature of its apparent content, it functions also as cover text (in the sense that it covers the true meaning encrypted within by masking it with another meaning, all without expanding the encrypted information).

ZKP-Q&A (Zero-Knowledge-Proof of User Authentication & Message Integrity): An unstructured query-response exchange made using the semantic domain of the ciphertext, validating the integrity of STE communications without sender or receiver divulging any new information. It respects the virtues and operational requirements of stealth and of total-deniability available to preferred implementations of STE.

Semantic Transposition, in and of itself, is not a form of encryption, but if properly restricted in its applications it can be used as such.

At its most basic, Semantic Transposition is a process using human-authored natural language text as linguistic template for the machine-generation of human-like text, where the subject matter of the output, its meaning to us, is entirely distinct from the original. Preferred embodiments might direct ciphertext content to particular semantic domains. For example, ciphertext might be semantically and structurally constrained to fit the language profile of real-estate investment documentation, HR paperwork, or social correspondence.

Much of the original text's compositional style, flow, its explanatory and/or logical and/or ontological structure, and its lexical unpredictability, are preserved, though the meaning and vocabulary of the text has been transmogrified. Since the original input is human-generated and then transformed, the resulting output can be far more human-like, and undetectable even to machine classifiers than texts currently generated by language samples treated as 'prompts' for AI (like those currently being produced by OpenAI's GPT-3) primarily due to the preservation of author-specific and document-specific structural features. Following the original plaintext as template, each STE ciphertext will embody an author's signature quirks specific to a document: their logic, phrasing, semantic leaps, writing style, mood and attitude towards an intended audience in a particular moment. None of these features are left to be determined by global variables or statistical generalization. It will thereby avoid the random variations, the repetition, illogic and non-sequiturs, common to prompt-generated machine texts, along with any reliance on statistical generalizations that might be used by classifiers to cross-identify machine-output.

When implemented within the constraints of an encryption system, the Semantic Transposition process just described is restricted to symmetrical operations (operations that may be undone, proceeding from plaintext to ciphertext and vice versa) so that the original plaintext may be restored by the receiver via a lossless reversal of the process.

Preferred implementations offer two core advantages which are currently unique to semantic transposition encryption (STE), and could not be duplicated via prior-art techniques involving hard math encryption: operational stealth and total-deniability, described in detail below.

Stealth: STE output is indistinguishable from the natural-language texts of everyday communications. Its content may be automatically customized to mimic the traffic on any preferred channel of communication. As such, STE messaging, unlike that produced by the dominant paradigm, may avoid targeted attack, and STE documents may be passed through low-level or insecure communications channels, or stored alongside other unencrypted work on unprotected devices, without detection, under persistent cryptanalytical and forensic scrutiny.

Total-Deniability. for any STE encrypted ciphertext, unlimited cryptanalytic attacks, even by adversaries with access to relevant ST software, shall provide no positive cryptanalytic determination that a particular attempt was successful nor even that the document targeted was in fact encrypted to begin with. Any alleged "decryption" thus obtained is simply a function of STE software's capacity to generate meaningful text output for any text and key combination. The attacker's choice of target document, information channel profile, ST-Settings, key, and associated output, may therefore realistically be dismissed as nothing more than the curation of auto-generated fiction in support of some agenda. The system is explicitly impartial to truth and falsity, and will generate coherent alleged "decryptions" from any text, encrypted or not; the very fact of encryption is therefore deniable; this is what the 'Total' in 'Total-Deniability' means. Functioning like a linguistic deep fake engine, any allegations dependent on its output are inherently suspect and credibly deniable. As a parallel: if an adversary's allegations relied upon video admittedly generated with a deep-fake video engine, those allegations would be self-evidently suspect, and credibly deniable. The same is true for text allegedly "decrypted" by use of a linguistic deep-fake engine, even if that engine also subserves encryption (like STE).

To help in further distinguishing the proposed method over the prior art, it should be understood that STE is not steganography, as it does not rely on the introduction of additional information to provide cover for a hidden message. STE output is, on average, no different in length and complexity than its plaintext input. STE does not rely on added noise to conceal the original signal, nor on content created ex nihilo as distraction or decoy, but instead transforms the meaning of original plaintext to produce equally readable output of roughly equal length offering no semantic clues to its origin.

STE is not a codebook cipher. It does not depend on some fixed identities across vocabularies to encode and decode messages. In fact, to the extent that words and phrases in a ciphertext roughly correspond to particular bits of plaintext, that correspondence is ever changing, not only across documents, but often even within them. Thus, there are no lexical type-type identities to be uncovered, the existence of which might otherwise empower workable cryptanalytic attacks.

According to an embodiment of the disclosure, STE can include a novel method of information and communications validation in the form of a "Zero Knowledge Proof" query-response system. It would protect against identity theft & message injection, while confirming information integrity and that information sent or stored has not been altered intentionally or otherwise.

To protect and preserve the advantages of stealth and deniability inherent to the invention, information validation processes must be such that can be employed without calling attention to themselves, and without requiring that either party disclose secure information. The Zero Knowledge-Proof Query-Response method described as part of a preferred implementation of this invention does precisely that. It offers any party privileged to ST encrypted information the ability to initiate a shared validation exchange in the form of a seemingly innocuous query and response, preferably within the semantic domain used for the encrypted communication, to avoid raising suspicions: this may take a wide range of illocutionary forms, e.g., a request for clarification, or for added detail, or for supporting data, etc. According to an embodiment, it is semantically related to the natural-language subject matter of the ciphertext, not the plaintext, and thereby does not disclose anything of the secured plaintext content.

There are now described in greater detail embodiments of Semantic Transposition Encryption (STE).

In an embodiment of the disclosure, the Semantic Transposition (ST) algorithm, in accordance with its ST-Settings, analyses plaintext in relation to a semantics-and-language model to produce a directed topology unique to that plaintext. The text specific topology is then "transposed", or shifted, across the model, morphing to line up key semantic relationship types without regard to underlying vocabulary. No longer anchored to any of the plaintext's original terms, the topology is free to adopt the meanings that emerge from its new language context. The structure of semantic relationships is thereby preserved, while the textual bearers of meaning (e.g., words and phrases) are entirely distinct from the original input being now transposed into a new, target semantic domain making up the ciphertext.

To do so seamlessly, in such a manner as to preserve readability, internal coherence, and appropriate style and format in the output text, simple word-substitutions are not ideal; instead, in preferred embodiments, entire neighbourhoods of nested vocabularies, phrases, idiomatic expressions, along with document format profiles, would be recruited and arranged in support of the transposition.

According to an embodiment of the disclosure, the transposition function itself, the morphing and shifting of the plaintext topology across the Semantics-and-Language Model, is determined by a key in relation to the content of the plaintext itself. That relationship between key and plaintext, as it determines output, may display both cryptographic 'confusion' and 'diffusion', thereby adding additional computational barriers to statistical cryptanalysis even in cases where the entire STE installation has been compromised and information-theoretic security is thereby threatened. Transpositions may be further guided and constrained by the optional introduction of an information channel profile which puts constraints or limits to the semantic domain into which the ciphertext is generated.

Figure 3:
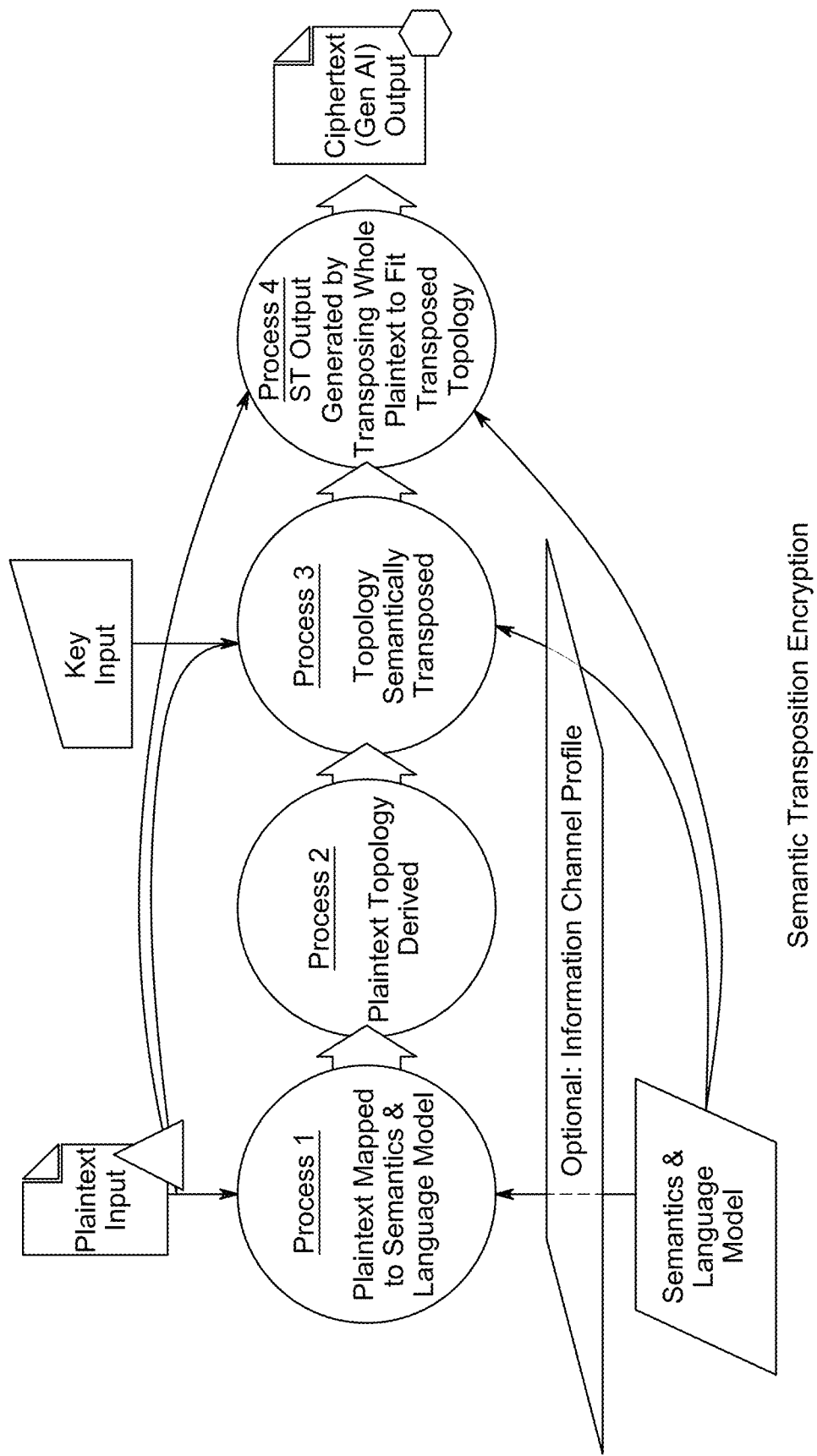
FIG. 3 is a schematic diagram illustrating a method for linguistically encrypting a plaintext into a ciphertext which appears to be a normal plaintext, but transposed into another semantic domain (semantic transposition encryption), by mapping the plaintext to a model, by deriving its topology and by performing a transposition into another semantic domain, according to an embodiment of the invention.

FIG. 3 illustrates the method which comprises various steps forming processes on their own. The input is a plaintext, presented as a text and containing information which needs to undergo a communication or storage and is presumably sensitive, and needs to be hidden from anyone obtaining the communication or stored document. The method described herein is performed to transform that original plaintext into an output which is a ciphertext. One of the requirements for the output (ciphertext) is to be another text with plausible language construction instead of being only gibberish, and this is obtained by performing a semantic transposition of the whole text into this ciphertext, including the sensitive information.

To do this, the text needs to be able to undergo a semantic transposition. To achieve this, there is a need to provide a semantics and language model, which provides a framework within which a computer will be made to understand the syntax and the vocabulary of the text being treated.

Therefore, according to an embodiment of the disclosure and in relation with "process 1" of FIG. 3, the computer processor executing the method will apply said semantics and language model to perform a mapping of the plaintext. This way, the computer can map words that are being used to related terms embedded in the model (its vocabulary) which is already stored and used by the computer to give a meaning to the words in the text (semantics) in relation to a framework, ontology, or knowledge-graph, as mentioned above. Doing this allows giving a computer value (one may also define it as a computable value) to the words or phrases. Also, the computer may further map the interrelations between the words in terms of their relationships across the semantics layer of the model and/or their associated probability distributions internal to the language model.

Doing this allows to derive a topology of the plaintext ("process 2"). In reference to the mappings assigned in "process 1", a machine representation can be algorithmically generated capturing the nature, direction, magnitudes, and/or overall geometry, of the relationships holding between the plaintext terms mapped. Such a representation might preserve semantic and/or probability (e.g., n-gram) relationships connecting the mapped terms. If we generate that representation to be separable from the lexical identity of the terms, replacing the names of words with parts-of-speech tags, along with their directed ordering (based on their position in the plaintext), what remains constitutes a very basic sort of text-topology, in the terms of this invention. In preferred embodiments, conceptual-types, or ontological tags, would also be included in the resulting topology, so that the transpositions are directed to semantic neighbourhoods sufficiently ontologically rich as to give natural plausibility to the ciphertext output. Each aspect of that topology can be assigned a computable value.

Then, the text-topology is ready to undergo semantic transposition (process 3). The topology derived in "process 2" may be shifted, morphed, stretched, and compressed, according to computable rules dictated by the chosen encryption key (or by a combination of the key and features of the original plaintext), in such a way that its nodes are affixed to new terms suitable to coherently filling out the linguistic structure it represents. 'Suitability' here is determined by the ST-Algorithm in accordance with ST-Settings.

As mentioned above, there may be put constraints in the transposition, that is the information channel profile may dictate, among other, a dictionary or vocabulary for the ciphertext, such that the encryption key is chosen to bring the ciphertext into the desired target semantic domain corresponding to that information channel profile.

In the end (process 4), all distinguishing features of the original plaintext chosen to be preserved in encryption (e.g., users may or may not choose to preserve punctuation) are transmogrified to conform to the now-transposed topology. Features would include, among others, the probability relationships across word and phrase positions in the text (as those help determine new word-identities), punctuation if desired, and even formatting preferences (whereby author signature deviations from standard exemplars are reproduced relative to formats appropriate in the new semantic context). Each attribute, including word-probability relationships, must be preserved as computable values, and the ciphertext output of each such value must preserve distinctiveness such that a symmetrical operation can return the original value during the process of decryption. For example, if in the original plaintext a noun used as the subject of a sentence is modified with a commonly associated adjective, then the corresponding ciphertext sentence will also feature an adjective of high probability in relation to the subject term (that specific probability varying in relation to key-driven shifts in topology); using the appropriate key, that resulting probabilistic relation between subject and adjective can then be symmetrically transposed back into the original domain, during decryption, to recover the original pair of noun and adjective. This process of preserving relationships as computable values ensures that every word and phrase, every semi-colon and new paragraph choice, as they are derived within the new semantic context (defined by the transposed topology) may, in their relationships to the whole of the ciphertext, be suitable for symmetrical decryption operations. The output of "process 4" is a ciphertext which may be stored or communicated to another party and which has the properties already discussed, providing stealth, total-deniability, and information-theoretic security.

Figure 5:
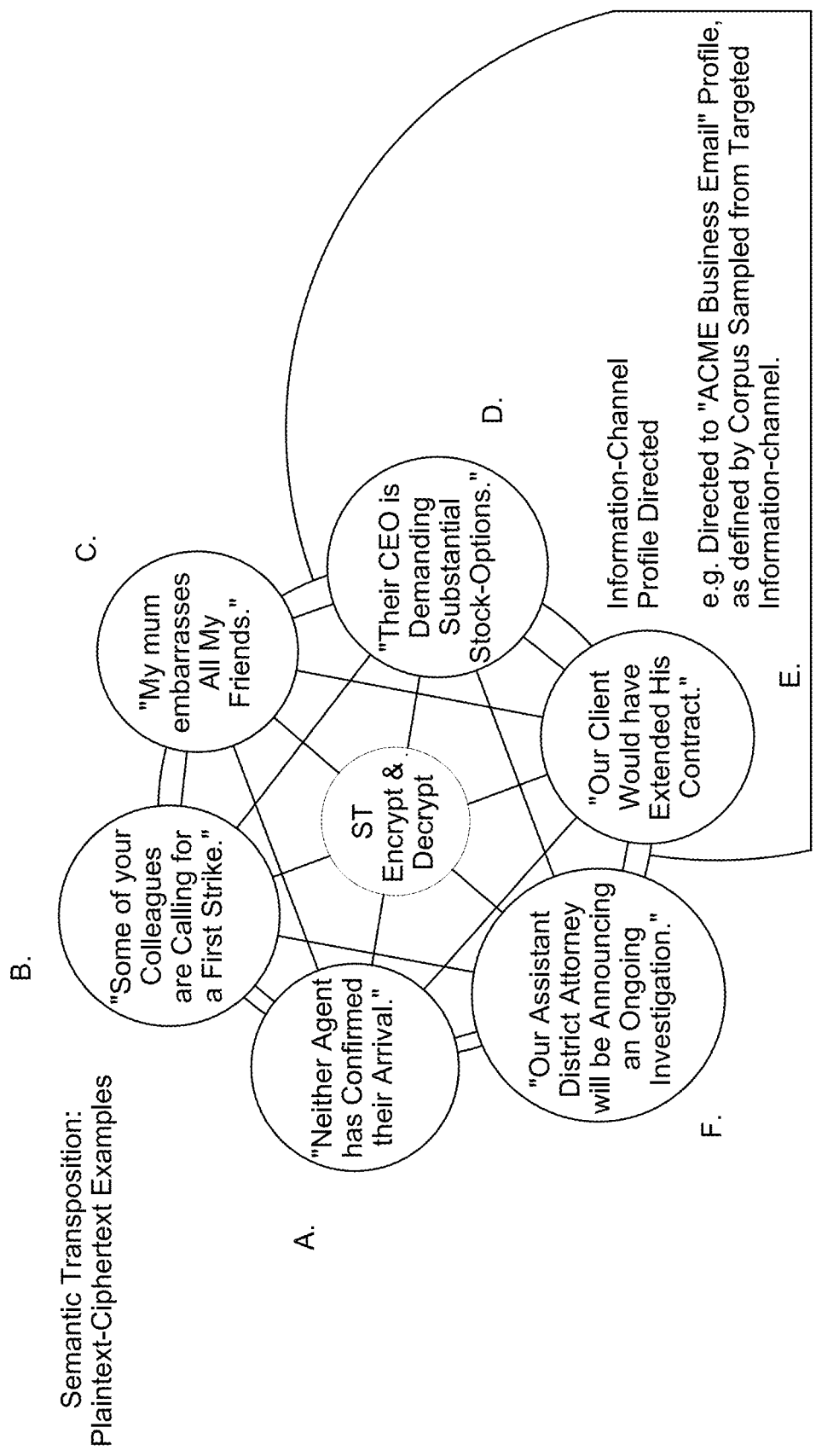
FIG. 5 is a schematic diagram illustrating different sentences in which each one can be a result of a semantic transposition encryption using different encryption/decryption keys of any other one of the sentences, according to an embodiment of the invention.

The diagram shown in FIG. 5 illustrate this example, i.e., any pairing of the six sentences there identified could, under the right ST installation, embody semantic transpositions of one another. That is to say, if one were to choose, for example, 'Sentence A' ("Neither agent has confirmed their arrival."), and treat it as plaintext, there exists some key that would generate 'Sentence B' as ciphertext, and another key that would generate 'Sentence C', another for 'Sentence D', and so on, given an appropriate ST installation (model, settings, and information channel profile). Importantly, if one were to instead treat 'Sentence A' as ciphertext, and apply ST as decryption, there would also exist some key such that 'Sentence B' would be the plaintext output, and the same goes for 'Sentence C', etc. So there is nothing in the sentences that makes them uniquely plaintext or ciphertext. They are simply sufficiently structurally isomorphic to make them potential ST counterparts, given the correct key solution, and therefore might function as plaintext or ciphertext in relation to one another. A few things might be said about such sets of text counterparts: First, the set of potential, plausible, natural language counterparts (i.e., like that small sample illustrated in FIG. 5) grows as the text gets longer: while short messages may have only tens of thousands of potential ST counterparts, very long texts may have trillions-of-trillions. There is a direct correlation between the range of valid ST output and the length of message; this fact means that cryptographic equivocation increases with message length, instead of decreasing (as it would with most traditional encryption), which is key to STE achieving Shannon type information theoretic security. Second, it should be noted that the sentences in FIG. 5 do not share the same number of words (ranging from 6 to 10), and that is because STE does not always map single words to single words, but may instead map words to phrases or phrases to words, averaging out in the long run (this is often in cases where word groupings have high n-gram measures; they may be treated as a single unit for purposes of transposition). For example, in 'Sentence F', the subject "Our assistant district attorney" (four words) corresponds with "My mum" (two words) in 'Sentence C'. The consequence of this for security is profound: without one-to-one type-type mappings between words, there cannot be applied anything like code-book frequency analysis. Such word level cryptanalysis would fail even with massive samples of ST ciphertext to work with. The end result is more like supervenience holding between corresponding parts of text, and less like lexical type-type identities. Moreover, the transposition depends on how the key interacts with features of the plaintext, and so for each new plaintext the topology is distinct, and therefore word or phrase correlations between plaintext and ciphertext do not systematically persist from one text to the next (unless one chooses, for the sake of conversational Stealth, that threaded conversations should share a common topology; some embodiments of the invention would include that option). Third, if an information channel were applied to STE, then a reduced subset of the potential counterparts would be available. For example, in FIG. 5, sentences 'D' and 'E' are identified as potential output from an STE application where the information-channel-profile is labeled "ACME business email": a hypothetical profile defined by a targeted corpus of email examples from the ACME company. With that information channel profile applied to encryption output, any of the other sentences ('A'-'C', or 'F'), might generate 'D' or 'E' as ciphertext, but not vice versa. Fourth, it should be noted that for every sentence available as a potentially valid ST decryption of 'Sentence A', its contradiction will also be a potential decryption. For example, 'Sentence A' says, "Neither agent has confirmed their arrival", but the negation of that, "Both agents have confirmed their arrival" is also sufficiently structurally isomorphic to the other sentence examples as to be a potential ST counterpart for each, given the right key. This is important for ST security because it suggests that the overall semantic space of possible decryption solutions does not itself bias in favour of any particular truths that might be revealing.

Semantic Transposition Decryption: Because STE restricts the semantic transposition process to symmetrical operations, as described above, that process may be reversed to restore the original plaintext, as described in relation with FIG. 4. A preferred embodiment of this decryption process is identical in description to the process of encryption as detailed above in relation to FIG. 3, however ciphertext and plaintext have now swapped roles, and the transposition operations are reversed (if a key-driven rule stretched some element of the topology during encryption, it would shrink proportionally during decryption).

Figure 4:
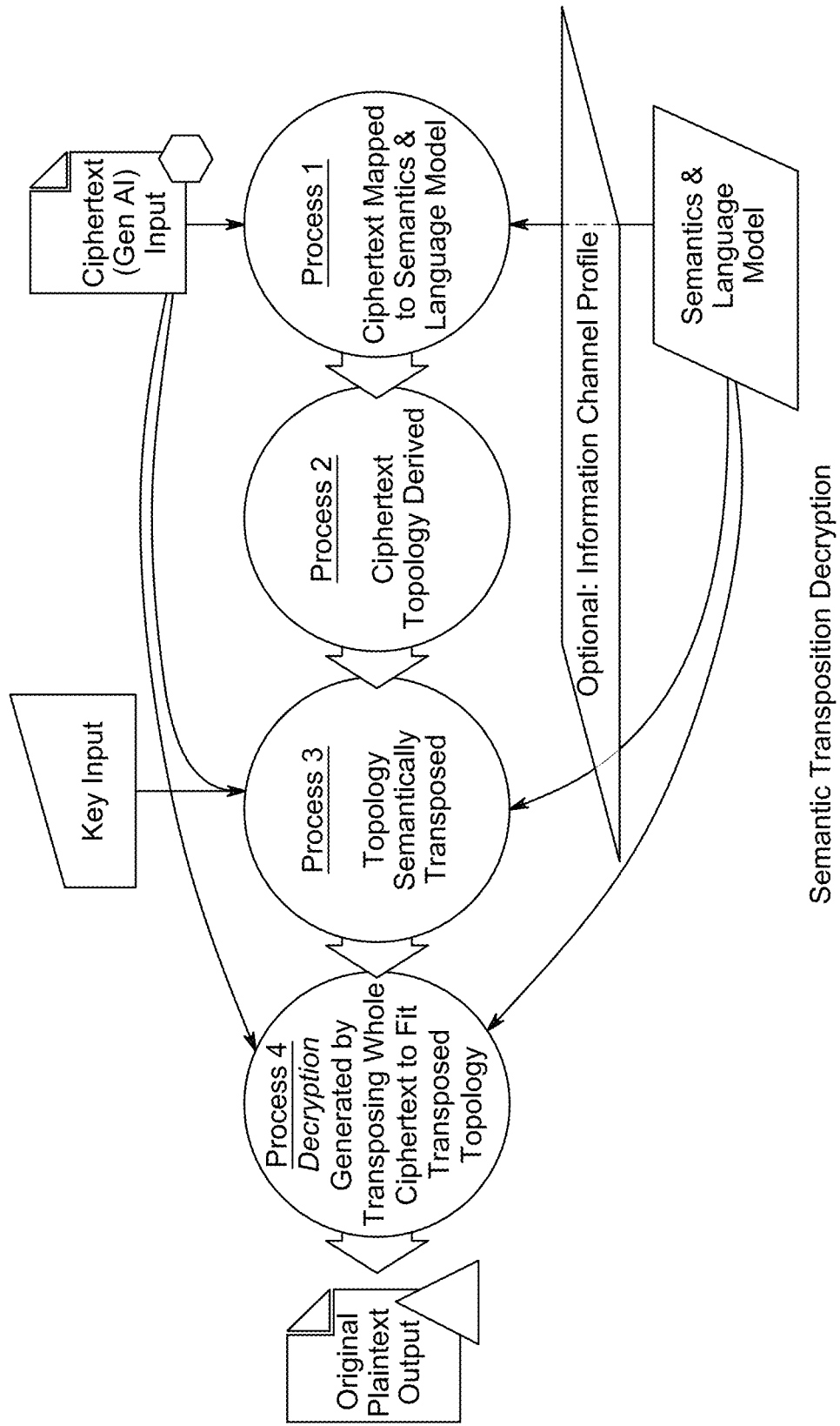
FIG. 4 is a schematic diagram illustrating a method for linguistically decrypting a ciphertext as outputted by the method illustrated in FIG. 3 into the plaintext conveying the intended meaning of the original document, by mapping the ciphertext to a model, by deriving its topology and by performing a transposition into another semantic domain using a decryption key which is consistent which the key used for the linguistic encryption, according to an embodiment of the invention.

FIG. 4 is therefore very similar to FIG. 3 but wherein the input is the ciphertext and the output is supposed to be the original plaintext if you have the key, and any other text if a wrong key is tentatively used. For greater conciseness, the steps of FIG. 4 will not be repeated (they mirror the steps involved in FIG. 3, as described above). However, let us mention that the key used for decryption depends on the key used for encryption.

What makes this a suitable mechanism for encryption is the availability of tens of millions, or even trillions (depending primarily on the size of the plaintext and the size of the Semantics & Language Model used) of potentially suitable transpositions for any given plaintext topology, each a basis for the generation of unique, coherent, text. As transposition is symmetrical, there is an equal number of potential plaintext sources for any given ciphertext. So, the challenge for any cryptanalyst is determining which of all of those is the original plaintext, and without the key they are equally plausible (from both an information and semantics perspective). From a factual standpoint, some potential decryptions will appear to assert falsehoods, and an adversary might reject some potential solutions on that basis. However, such a process of elimination can only ever reflect the prior probabilities of the adversary, and cannot be more than a curated expression of confirmation bias applied to hypothetical plaintexts, and is therefore not reflective of any information gained from the ciphertext itself (i.e., such a method of attack does not constitute a failure of information theoretic security).

Security for Information with Real-World Safety for Users: Highly secured or classified information invites not only cryptanalytic attacks, but also attacks on human beings who are thought to have access to that information; this may involve efforts at social, psychological, and even physical coercion. The stealth and deniability features of STE not only provide unbreakable security from cryptanalytic attack, but also provide real-world safety to users of STE who might be open to coercion, while deterring adversaries from attempting either sort of attack as they are not even aware that encrypted communications are sent from or received by these people (the fact that the communications are encrypted not being apparent to an outsider).

To fully appreciate the security of stealth and total-deniability combined, it may be useful to invoke the "rubber hose" scenario: a situation where torture is used by an attacker to gain access to secret communications. What advantages would a tortured defender have with STE? Exemplary cases A to F are detailed below.

A. The defender can simply deny that any secrecy is at work—the messages just are what they seem and the defender appears ignorant of anything like STE. The ciphertext content would be customized to mimic a preferred communications channel, so content comes with its own cover story. Attackers may interpret this response as truthful—there is no security at work; or, they may simply assume the defender is ignorant of the security system. Either way, a flat denial works well to protect the defender in this situation.

B. The defender can misidentify which texts are the ciphertexts—as they are indistinguishable from background communications, an adversary would have no intrinsic means to demarcate encrypted and unencrypted texts. The defender would seem to have complied with the demands of his or her attackers through these disclosures, without offering them anything of real value.

C. The defender can lie about his or her key, believably—any made-up key would still produce linguistically plausible text and so would not be obviously false (a secondary key might already have been applied to non-critical documents, in advance, thereby offering misleading 'proof' of its legitimacy). Some embodiments of STE would use targeted semantic domains for both encryption and decryption. With this implementation, the content produced by any fake key would be thematically close to the original plaintext, but factually false. For example, fake keys might each generate a document with the vocabulary and structure typical of military intelligence, but with no systematic resemblance to truth.

D. The defender can offer a combination of "B" and "C"—identifying the wrong texts as ciphertext, and offering a fake key, the defender seems in full compliance with attackers while promoting the hopelessly futile application of their resources.

E. The defender can give the authentic key, after having lied—having already generated plausible texts based on fake keys, there would be nothing to indicate to the attacker that the authentic key was any different. As such, all admissions aside, the attacker would be in no position to confirm that one key, rather than another, is authentic, other than independent confirmation of the full factual content of a potential decryption, in which case they would have learned nothing new.

F. The defender can simply tell the truth, offering full disclosure, including real key information. Even if the attackers have their own copy of ST software, unless they have access to the specific version of the Semantics-and-Language model being used, as well as the ST-settings, and information-channel-profile, the key information will be little to no use. One should keep in mind that semantics-and-language models are easily modified and organizations may keep a wide range of bespoke variants, and will likely assign different ST-settings to different user groups. If all such assignments are left to systems administrators, and the encryption process is opaque to users, then users would not have access to the these elements necessary for decryption, nor information about them.

Conversely, systems administrators may be protected by their ignorance of the keys being used.

Given all of these defenses, the success of 'rubber hose' techniques seems improbable, even with compliance, creating deterrence, offering real protection for the users of ST encryption against physical, psychological, or social coercion.

Figure 6:
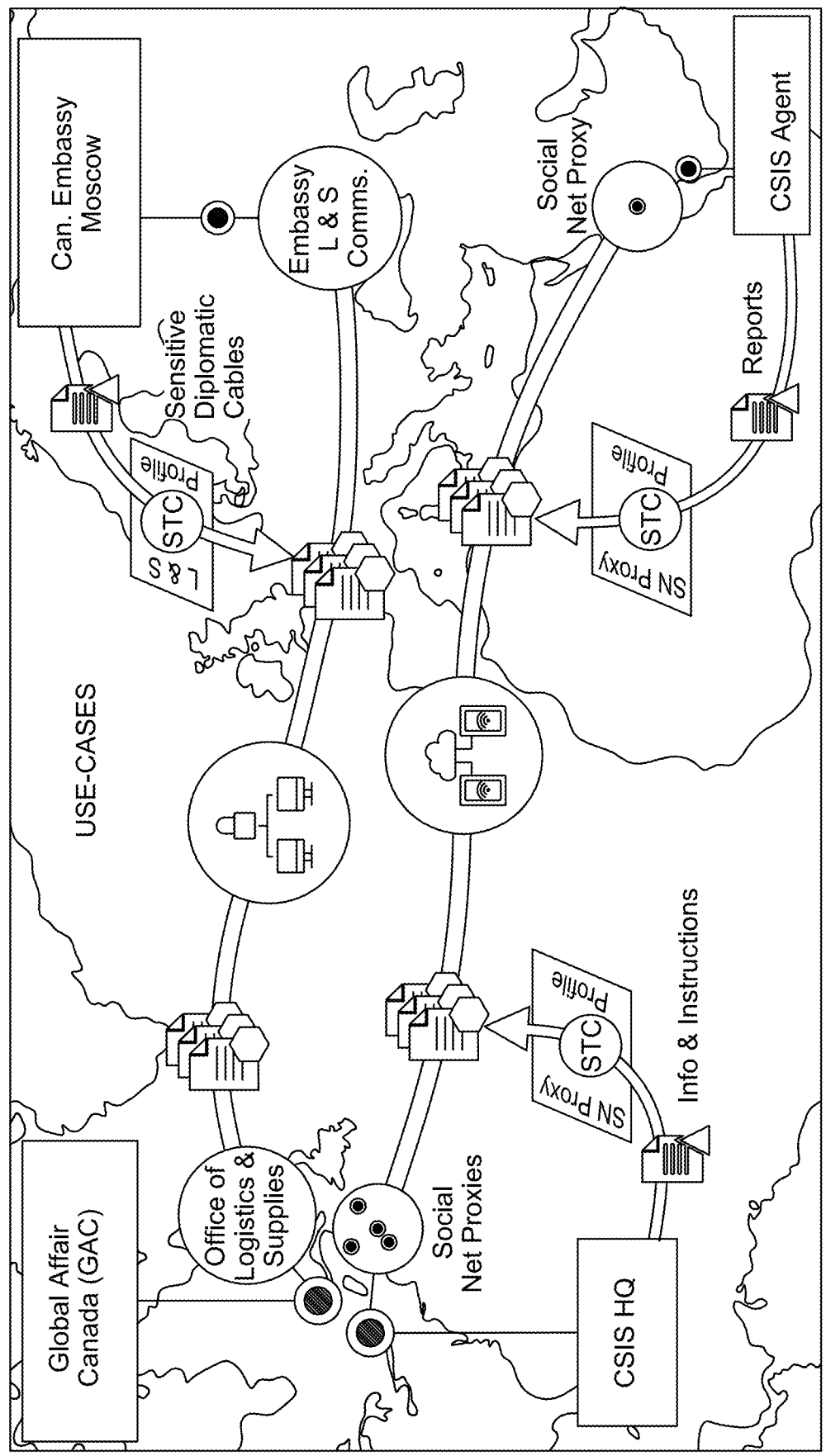
FIG. 6 is a schematic diagram illustrating examples of communications between different parties across different channels, comprising encryption and decryption, according to an embodiment of the invention.

FIG. 6 is an exemplary diagram showing different channels of communication being used between examples of parties (users) over the globe, and giving examples of communications which can benefit from the method according to the present disclosure, for example: sensitive diplomatic cables, secret intelligence agent reports, but could also include other cases such as highly-sensitive government or agency communications, industrial secrets and the like.

Zero-Knowledge-Proof of User Authentication & Message Integrity: The Stealth and Total-Deniability of STE communications depend upon ciphertexts not carrying any unusual security codes—nothing more than whatever is normally imparted automatically according to an information channel profile. This means that the challenges of user authentication and message integrity cannot be addressed from within the contents of STE ciphertexts.

To protect against identity theft and message injection an authentication mechanism must be available that can be employed without calling attention to itself and without requiring that either party disclose secure information. In the context of STE, this means meeting six requirements for proof:

Requirement 1. It should prove that the last message, or messages, sent is/are identical to that received;

Requirement 2. It should prove that both users have access to those same messages, Requirement 3. It should prove that they each hold the correct key, Requirement 4. It should prove that their communications are pathed through the correct Semantics-and-Language model (or model variant), as well as the correct ST-settings and information-channel-profile, Requirement 5. It should prove that they each have access to STE software, including the ST-algorithm, and, Requirement 6. It must do all of 1-5 requirements without providing new knowledge to either party.

ZKP-Q&A authentication as disclosed herein is designed to meet all six requirements for proof, and may or would be included in a preferred embodiment of STE.

ZKP-Q&A is a query-response system generating all the above proofs from the reply to a "follow up question", or "clarification email", sent at any point between either of those communicating. The question or demand for information or clarification can take whatever form, and use whatever language, is most natural and discrete based on the cover-content of recent ciphertexts (i.e., based on STE encrypted output, that is the ciphertext, taken at face value). It might casually ask for a missing fact, or question the meaning of some element of the ciphertext, or request a quantitative estimate. The reply is generated using the last message, combined with the copied content of the query itself, all of which is processed using the appropriate key and "answered" via the semantics & language model, now using it as a deep-fake text generator, not merely as an encryption device. If any of these system elements are not identical for sender or receiver, then the reply will not match what is expected, and communications can be shut down or additional authentication efforts attempted.

Since the query was based on ciphertext cover content, no real information is being shared in query or response. It is akin to priming two deep fake engines with fictional content (requiring identical input and linked keys) to see if their output is identical.

In other words, a zero-knowledge-proof method for user authentication and verifying message integrity comprises the steps of:

by a first user, sending a ciphertext via a communication channel to a second user, the ciphertext being a human-readable text produced by a semantic transposition engine performing semantic transposition of a semantically mapped plaintext into a semantic domain distinct from the plaintext;

receiving from the second user a query in relation to the content of the ciphertext, the query being within the semantic domain of the ciphertext;

generating a reply for the query by using the semantic transposition engine and an assigned key, but without performing the semantic transposition, instead remaining within the semantic domain of the ciphertext; said reply being expected to be also reproduced by the second user; and sending the reply for the query to the second user for comparison, for user authentication and verifying message integrity.

According to an embodiment, the query is sent through the communication channel, and it is a request for information, clarification, details, or confirmation of contents in the ciphertext, treating the ciphertext content as factual.

ZKP-Q&A authentication can be more or less automated, relying in part or in whole on system initiated and managed processes:

Manual Query: In some preferred embodiments, queries used could be written by human users in relation to ciphertext content, and the process of sending, processing, and responding to them initiated by user action. In this case the response would still be generated by the ST system, used as a prompted deep fake engine.

Fully Automated: The queries could be initiated and generated entirely by the ST system, using it as a linguistic deep fake text generator. Their character (type of information requested), along with their initiation and timing, should involve a random or pseudo-random function so that their occurrence does not constitute a systematic indicator that those communicating are utilizing STE. Responses should also, in their initiation and timing, make use of (pseudo) random functions so as not to expose their being part of a validation system.

Authentication and information integrity are here discussed in the context of communication, rather than encryption for purposes of storage. However, as stored information may be tampered with, authentication and integrity issues arise also in that context. So, an analogous use of the invention's authentication system (ZKP-Q&A) is available to storage contexts: the "query" method being applied initially at the time of storage, and the "response" method applied at any point for purposes of access/decryption. Results can be compared at the point of decryption to validate the integrity of stored information.

Finally, it should be noted that the method described above is to be applied using computer systems, e.g., the plaintext is in a computer-readable format such that a computer value, also known as a computable value, can be attributed to the terms by the computer system reading the term in a computer-readable format. Also, the transposition is also performed using computer systems. The computer systems can be a standalone computer or microcontroller of any suitable type (desktop, laptop, handheld such as smartphone or tablet, etc.), a server, or implemented using the cloud. The computing device should comprise a memory to store instructions and the data being treated, and a processor which executes the instructions to perform the method. The computing device may also depend upon one or more mechanisms dedicated to large-scale parallel processing, such as a graphics card or cards with significant VRAM. A telecommunication network is also provided to send the ciphertext to another party or to send the ciphertext for storage, and computer system is required at the other side to perform the decryption in a manner similar to the encryption. The method for zero-knowledge-proof authentication of user and message integrity is also performed using computer systems at both end and a telecommunication network to perform the link between them for the communication channel in which communications take place with the information channel profile.

Finally, with respect to the U.S. Pat. No. 10,608,814 identified as prior art above, there are many differences with the method according to the present disclosure. In U.S. Pat. No. 10,608,814, the system output (i.e., the ciphertext itself) is self-evidently encrypted. It does not present as plausible natural-language text, lacking entirely the 'stealth' feature of STE. Also, while it may offer some legal deniability with respect to which, of a few alternatives, is the original plaintext (and which are decoys), it does not support a total denial of the fact of encryption itself. It is not plausible to claim that the ciphertext is in fact a mundane plaintext (as one plausibly might with STE). The decoys of that prior-art method are in the same domain as the original plaintext, so neither ciphertext nor decoys experience anything like a 'transposition' to a new semantic domain. There is therefore no target corpus from which to derive a profile that might direct solutions semantically. Additionally, equivocation is generated via added-noise. Every single 'decoy' added to the space of potential alternative plaintext solutions requires more text be added to the ciphertext. Thus, the length of the transmitted and stored encryptions will grow linearly with the equivocation space. The result is that a plaintext of a dozen words may require the transmission and storage of hundreds of words, just to achieve 100 potential 'decoys'. This makes that prior-art method dramatically inefficient for communications and storage, in comparison to the method according to the present disclosure (STE). With STE, the space of plausible plaintext solutions may be in the trillions, with the ciphertext output nonetheless equal in size to the original plaintext (on average). STE never adds "noise" to create equivocation.

Also, that prior-art method does not include any generative 'natural language' system, as there is no reliable or systematic basis for generating plausible, believable, natural-language alternatives to the correct plaintext solution. Instead, U.S. Pat. No. 10,608,814, in paragraph of the publication, suggests that the intelligence of the decoys will depend on the user, or potentially technology, generating them. Unlike STE, this is not an Intelligent system for producing plausible "natural language" decryptions alternative to the correct solution. Instead, U.S. Pat. No. 10,608,814 relies entirely on some outside intelligence to make linguistic choices that might fool a cryptanalyst. Furthermore, U.S. Pat. No. 10,608,814 does not rely on an underlying AI Semantics & Language Model, or anything even remotely similar. It instead invokes simple lists or arrays of vocabulary—i.e., words and phrases deemed in advance to be suitably confusing as decoy content, without prior regard for plaintext content. Also, U.S. Pat. No. 10,608,814 does not offer a zero-proof-knowledge method for authentication and integrity verification can be implemented, as in the method described herein.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for linguistically encrypting a plaintext, comprising:

mapping the plaintext to a semantics and language model, thereby forming a semantically mapped plaintext;

deriving a topology of the semantically mapped plaintext independently of underlying vocabulary in the semantically mapped plaintext, wherein the step of deriving the topology comprises generating a machine representation indicating a semantic nature of terms in the semantically mapped plaintext and an ontological nature of terms in the semantically mapped plaintext, and further indicating a relation between the terms, a direction, and probability relationships connecting the terms in said direction; and using an encryption key for linguistic encryption, applying a semantic transposition onto the semantically mapped plaintext, independently of the underlying vocabulary, and using the topology, to produce a ciphertext which is a human-readable text in a semantic domain distinct from the plaintext, wherein the semantic transposition transforms a meaning of the underlying vocabulary of the semantically mapped plaintext to produce the ciphertext in the semantic domain having another, distinct meaning.

2. The method of claim 1, wherein the plaintext and the ciphertext are substantially equal in length.

3. The method of claim 2, further comprising conserving said topology during the step of applying the semantic transposition onto the semantically mapped plaintext.

4. The method of claim 3, wherein conserving the topology comprises preserving relationships as computable values to ensure that encryption performed by applying the semantic transposition can undergo, symmetrically, a decryption by applying another semantic transposition.

5. The method of claim 2, further comprising transforming the topology by any one of: shifting, morphing, stretching, and compressing the topology during the step of applying the semantic transposition onto the semantically mapped plaintext, according to computable rules to be applied on the topology and which are dictated by the encryption key.

6. The method of claim 5, wherein transforming the topology is performed according to computable rules to be applied on the topology which are dictated by the encryption key in combination with features of the plaintext.

7. The method of claim 1, wherein the step of applying the semantic transposition onto the semantically mapped plaintext using the encryption key is constraining by providing an information channel profile and limiting to the semantic transposition to transpose in a semantic domain which is consistent with the information channel profile.

8. The method of claim 1, wherein the step of mapping the plaintext comprises mapping interrelations between words of the plaintext in terms of: relationships across a semantics layer of the semantics and language model, or associated probability distributions internal to the semantics and language model; wherein the step of applying the semantic transposition is performed by taking into account said interrelations.

9. A method for linguistically decrypting a ciphertext which is a human-readable text, comprising:

mapping the ciphertext to a semantics and language model, thereby forming a semantically mapped ciphertext;

deriving a topology of the semantically mapped ciphertext independently of underlying vocabulary of the ciphertext, wherein the step of deriving the topology comprises generating a machine representation indicating a semantic nature of terms in the semantically mapped ciphertext and an ontological nature of terms in the semantically mapped ciphertext, and further indicating a relation between the terms, a direction and probability relationships connecting the terms in said direction; and using a decryption key for linguistic decryption, applying a semantic transposition onto the semantically mapped ciphertext using the topology to produce a plaintext which is human-readable and which is in a semantic domain distinct from the ciphertext independently of the underlying vocabulary, wherein the semantic transposition transforms a meaning of the underlying vocabulary of the semantically mapped ciphertext to produce the plaintext in the semantic domain having another, distinct meaning.

10. The method of claim 9, wherein the plaintext and the ciphertext are substantially equal in length.

11. The method of claim 10, further comprising conserving said topology during the step of applying the semantic transposition onto the semantically mapped ciphertext.

12. The method of claim 10, further comprising transforming the topology by any one of: shifting, morphing, stretching, and compressing the topology during the step of applying the semantic transposition onto the semantically mapped ciphertext, according to computable rules to be applied on the topology and which are dictated by the decryption key.

13. The method of claim 12, wherein transforming the topology is performed according to computable rules to be applied on the topology which are dictated by the decryption key in combination with features of the ciphertext.

14. The method of claim 9, wherein the step of mapping the ciphertext comprises mapping interrelations between words of the ciphertext in terms of: relationships across a semantics layer of the semantics and language model, or associated probability distributions internal to the semantics and language model; wherein the step of applying the semantic transposition is performed by taking into account said interrelations.

15. A zero-knowledge-proof method for user authentication and verifying message integrity, comprising the steps of:

by a first user, sending a ciphertext via a communication channel to a second user, the ciphertext being a human-readable text produced by a semantic transposition engine performing semantic transposition of a semantically mapped plaintext into a semantic domain distinct from the plaintext, independently of underlying vocabulary of the plaintext, wherein the semantic transposition transforms a meaning of the underlying vocabulary of the semantically mapped ciphertext to produce the plaintext in the semantic domain having another, distinct meaning;

receiving from the second user a query in relation to the content of the ciphertext, the query being within the semantic domain of the ciphertext, within underlying vocabulary of the ciphertext;

generating a reply for the query by using the semantic transposition engine and an assigned key, but without performing the semantic transposition, instead remaining within the semantic domain of the ciphertext; said reply being expected to be also reproduced by the second user; and sending the reply for the query to the second user for comparison, for user authentication and verifying message integrity.

16. The zero-knowledge-proof method of claim 15, wherein the query is sent through the communication channel.

17. The zero-knowledge-proof method of claim 16, wherein the query is a request for information, clarification, details, or confirmation of contents in the ciphertext.

18. The zero-knowledge-proof method of claim 15, further comprising, for each sending of the ciphertext, repeating the steps of receiving from the second user the query, generating the reply and sending the reply for comparison this process in both directions, so that each sending of the ciphertext comprises mutual user authentication and verification of message integrity.

* * * * *